Figure 1:
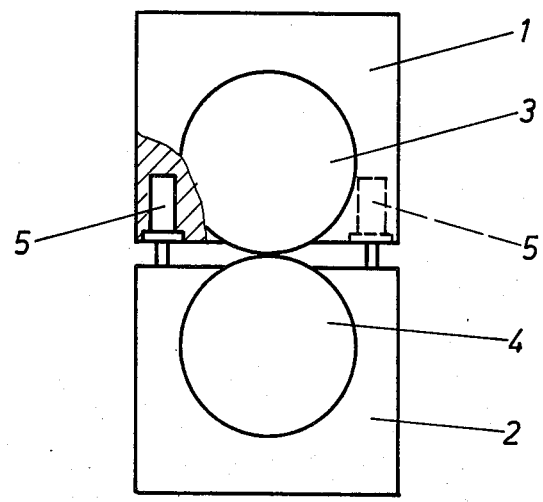

United States Patent [19]

Sack et al.

[11] 4,161,885
[45] Jul. 24, 1979

[54] MEASURING APPARATUS FOR MEASURING THE ROLL GAP IN GAUGE-CONTROLLED ROLL STANDS

[75] Inventors: Ernst T. Sack, Ratingen-Hosel; Friedrich Nordmeyer, Dusseldorf; Emil F. Kersting, Ratingen, all of Fed. Rep. of Germany

[73] Assignee: Sack GmbH, Dusseldorf-Rath, Fed. Rep. of Germany

[21] Appl. No.: 801,346

[22] Filed: May 27, 1977

[51] Int. Cl.² .................................................. G01N 9/24
[52] U.S. Cl. ....................................... 73/597; 73/628; 73/644
[58] Field of Search .................. 73/67.5 R, 67.6, 67.7, 73/67.8 R, 71.5 (U.S. only), 597, 618, 620, 624, 627, 629, 628, 644; 340/1 R; 72/16, 34

[56] References Cited

U.S. PATENT DOCUMENTS

| 2,407,294 | 9/1946 | Shockley et al. | 73/67.8 R X |
| 3,299,696 | 1/1967 | Dickenson | 73/71.5 |
| 3,401,547 | 9/1968 | Hall et al. | 73/67.5 R X |
| 3,508,623 | 4/1970 | Greenstein | 340/1 R X |

FOREIGN PATENT DOCUMENTS

| 2358207 | 12/1975 | Fed. Rep. of Germany. | |
| 254114 | 7/1970 | U.S.S.R. | 73/67.7 |

Primary Examiner—James J. Gill
Attorney, Agent, or Firm—John J. Dennemeyer

[57] ABSTRACT

Apparatus is provided for measuring the roll gap in roll stands with automatic gap control. The apparatus comprises two relatively movable components which may interfit telescopically. The two components have respective measuring surfaces at one of which is located a pulsed ultrasonic signal transmitter. A sound receiver is located either on the same measuring surface or on the other measuring surface. Measuring means are provided for measuring the time taken for the sound pulses to travel between the measuring surfaces.

6 Claims, 2 Drawing Figures

U.S. Patent

Jul. 24, 1979

4,161,885

MEASURING APPARATUS FOR MEASURING THE ROLL GAP IN GAUGE-CONTROLLED ROLL STANDS

The invention relates to a measuring apparatus for measuring the roll gap in gauge-controlled roll stands, with two opposing measuring surfaces varying positively in their spacing in the case of changes in the roll gap (German Offenlegungsschrift No. 2 224 909). Recent developments in the field of monitoring measured values for automatic roll gap controls shows that the measurement of varying inductances is predominant. This is also true for the induction gauge of telescopic construction for measuring the spacing between two opposing mounting members for the working rolls as well as for non-contacting induction measuring apparatus according to German Patent Specification No. 1 931 654 and German Offenlegungsschrift No. 2 224 909. Whereas the encapsulated closed telescopic tube-like construction is still suitable for rough rolling mill operations at the very beginning, it should however be stated that the induction principle no longer corresponds to the requirements generally as regards resolution and linearity or measuring accuracy. Non-contacting inductive monitoring of measured values suffers from the drawback that it can be impaired by the occurrence of scale and by the cooling fluid. German Offenlegungsschrift No. 2 439 580 gives one example of an encapsulated construction of an inductive distance measuring device, which is more favourable in this respect.

The invention intends to provide a measuring apparatus for measuring the roll gap in gauge-controlled roll stands, which apparatus operates according to the electrical principle and facilitates higher resolution when monitoring the measured value and thus more accurate monitoring for the electronic control device. In addition, monitoring of the measured value should be possible over the entire adjusting path of the rollers without an additional adjustment to a zero point, which in the case of an induction gauge is necessary in order to adjust the gauge to the range of greatest sensitivity. In solving this object, the measuring apparatus according to the invention is characterised by a device consisting of a transmitter and receiver, for monitoring the travelling time of pulses of an ultrasonic pulse repetition frequency emitted by the transmitter, between the measuring surfaces. Since the transmitter and receiver are located on the same measuring surface and the other measuring surface is constructed as a spherical reflector, the invention makes use of the echo-sounding principle known in other fields, with the special feature that the transmitter frequency must be an ultrasonic frequency, since the speed of propagation of ultrasonic waves is substantially less than those of electromagnetic waves and solely on this understanding with short test distances, such as are available when measuring a roll gap, changes in the travelling time can be monitored by measuring techniques and can be processed. With a recommended ultrasonic frequency of 10 MHz and a measuring frequency of 100 to 500 Hz emitted by measuring electronics, a resolution of 0.5 $\mu$m is to be expected, a value which did not seem possible hitherto.

The invention is not limited to the echo-sounding principle, in which the ascertained travelling time of a pulse corresponds to twice the spacing of the measuring surfaces from each other, but the transmitter can be located on one measuring surface and the receiver on the other, whereby the travelling time of a pulse corresponds to the magnitude of the measuring distance between the measuring surfaces, which can once more be regarded as a value or variation value of the spacing of the roller mounting members or the rollers themselves or their roll journals.

The principle according to the invention of measuring the spacing by way of the travelling time of pulses of an ultrasonic pulse repetition frequency has the effect that the resolution or measuring accuracy is independent of the length of the measuring distance between the measuring surfaces, i.e. is independent of the gauge of the material to be rolled. A zero point adjustment to a range of greater sensitivity in an induction gauge is unnecessary in view of the linear measuring characteristic of the principle according to the invention. It will be understood that the afore-mentioned measuring electronics belonging to the measuring apparatus according to the invention must be provided with a reference element in order to be able to recognise variations from a predetermined travelling time of the pulses as fault signals. An absolute measurement of the distance can be obtained due to the fact that when the rollers are placed one against the other, a counter value, which corresponds to the ascertained travelling time of the pulses, is set at zero.

Figure 2:
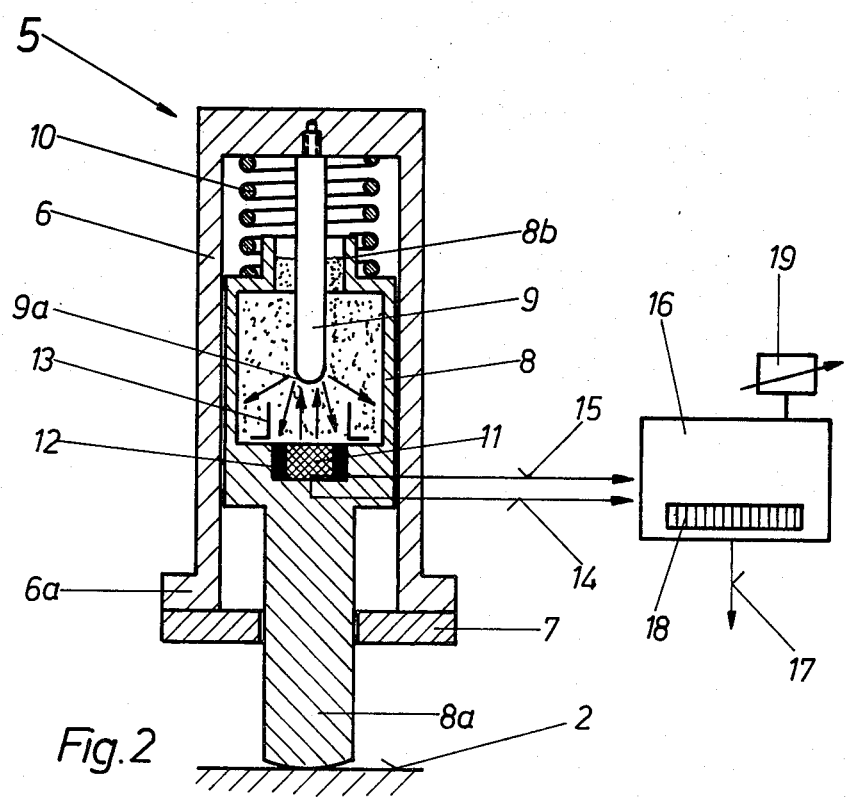

One embodiment of a measuring apparatus according to the invention is illustrated in the drawings and FIG. 1 shows two opposing mounting members with a pair of measuring apparatus according to the invention and FIG. 2 shows a measuring apparatus to an enlarged scale in cross section.

FIG. 1 shows diagrammatically two mounting members 1 and 2 with the working rolls 3 and 4, whose roll gap is to be measured by a measurement of the distance between the mounting members and variations in the distance are to be sent to a conventional automatic control device for keeping the roll gap constant. For monitoring the measured values, at least two measuring apparatus 5 are appropriately located between the mounting members, the measured values of which members can be set against each other in known manner to form a mean value. Due to this, the effect of inevitable tilting movements of the mounting members can be eliminated. The invention is not limited to the fact that a measuring apparatus 5 serves to measure the distance between the mounting members, but it could also be used for example in conjunction with mechanical feeler devices bearing against the cylindrical surfaces of the rollers or their roll journals.

According to FIG. 2, a measuring apparatus 5 consists of an outer cup-shaped component 6 with a flange 6a, which is closed by an annular cover 7. All the internal parts are thus completely encapsulated. Extending through the annular cover 7 is an elongated projection 8a of a cup-shaped internal component 8, which forms a chamber for receiving a fluid, consisting of an alcohol/water mixture. Penetrating the inner chamber part 8 and its fluid is a bar 9, which is attached to the outer part 6 and is of spherical shape at its lower end 9a. Relative movements between the outer part 6 and the inner chamber part 8 bring about a change in the penetration depth of the bar 9 in the fluid. In order to give the fluid the opportunity to displace according to the varying depth of penetration of the bar 9, the chamber part 8 comprises an upper tubular projection 8b, inside which the level of the liquid is intended to move. An expanding spring 10 between the base part of the outer part 6 and the inner chamber part 8 serves to keep the elongated extension 8a of the chamber part 8 pressed continuously against a bearing surface of the lower mounting member 2, when the outer chamber part 6 is fixed to the upper mounting member 1. In consideration of the possible return movements of the mounting members with respect to each other, the elongated projection 8a has an outer surface curved in the shape of a sphere.

In the longitudinal direction of the bar 9 with its spherical end 9a, a transmitter 11 for emitting an ultrasonic pulse repetition frequency is located in the inner chamber part 8, which in this embodiment is surrounded by an annular receiver 12, in which case at least the receiver 12 is always mounted so that it can move, in order to be able to align the latter with the direction of the ray and to be able to adjust the latter into the best position. The transmitter 11 represents one measuring surface and the spherical end 9a of the bar 9 represents the other measuring surface of the system, whose distance apart or change in distance is to be measured continuously. In the embodiment, the echo-sounding principle is used, which is made visible by the arrows. The arrows emanating from the transmitter 11 represent the emitted transmitting frequency, whereas the rays reflected by the spherical end 9a of the bar 9 point in the opposite direction. Appropriately provided in the region of the receiver 12 is a focussing system in the form of an annular diaphragm 13, by which the pulses not coming directly from the transmitter 11 are cut out. These stray reflections could hinder the formation of an accurate measured value of the distance between the two measuring surfaces, since the spherical shape of the measuring surface on the bar 9 favours the latter, but is appropriate for ensuring that the receiver 12 is always located in the spectrum of possible reflections even in the case of tilting movements between the outer part 6 and the inner chamber part 8 owing to tilting movements of the mounting members.

Since, according to the echo-sounding principle used, the travelling time of pulses of the emitted ultrasonic pulse repetition frequency is measured, it is essential that the propagation speed of the ultrasonic waves remains constant as far as possible under all operating conditions. For this reason, a fluid is used for filling the inner chamber part 8, the density of which fluid remains constant as far as possible in the case of temperature variations, for example a mixture of alcohol and water.

In FIG. 2, electrical details are not shown, such as the supply of the transmitting frequency to the transmitter 11. Only a lead 14 from the transmitter 11 is shown diagrammatically, as well as a lead 15 coming from the receiver 12 for supplying the transmitting frequency and also the receiving frequency to electronic digital measuring means 16 in which, in known manner, the travelling time of the pulses emitted until they are received is measured and converted into a measuring frequency preferably of between 100 and 500 Hz, which is supplied by way of the output 17 of the electronic measuring device to the automatic control device which is not shown. It will be understood that with the echo-sounding principle used, the distance between both measuring surfaces in the measuring apparatus 5 amounts to only half the length of travel corresponding to the travelling time of the pulses. The measuring electronics can be equipped with a counter 18, by which the effective spacing of the rollers 3, 4 from each other can be made visible in numerical values, in which case the counter 18 is set at zero when the rollers are placed one against the other in the position shown in FIG. 1 and are then moved apart by actuating the adjusting device of the rolling mill which is not shown. Since, in the case of automatic roll gap control devices, it is a question of maintaining a predetermined gauge reference value, the measuring electronics 16 are connected to a reference element 19 due to which only fault signals for forming the control variables in the automatic control device are emitted at the output 17 of the measuring electronics.

What is claimed is:

1. Roll gap measuring apparatus comprising two relatively movable components, a measuring surface on each component, wherein said two components engage one another in a telescoping manner, the inner component having a chamber part-filled with a fluid whose density is substantially constant during temperature changes, and being one of said measuring surfaces, and the outer component having a cup-shaped configuration with an annular cover at one end to permit an elongated projection of the inner component to project outwardly from said outer component, said outer component further including a rod attached to a closed end thereof, said rod being immersed in said fluid contained in said inner component and bearing the other of said two measuring surfaces, a pulsed ultrasonic signal transmitter and a sound receiver located on the same measuring surface, and measuring means for measuring the time taken for sound pulses to travel between said measuring surfaces, means for allowing said fluid to freely expand if the depth of penetration of said immersed rod increases to maintain said constant pressure of said fluid, said fluid container includes a base wall and said signal transmitter and sound receiver are located adjacent thereto, and said measuring surface on said immersed rod is constructed as a spherical reflector for pulses emitted by said transmitter.

2. The measuring apparatus of claim 1, further comprising annular diaphragm means surrounding said receiver to prevent stray reflections from impacting said receiver.

3. The measuring apparatus of claim 2, wherein said measuring means comprises means for measuring the time taken for the sound pulses sent by said transmitter to be reflected by said spherical reflector and received by said receiver.

4. The measuring apparatus of claim 1, further including an expanding spring located between said two telescopically engaged components.

5. The measuring apparatus of claim 1, wherein said means for allowing free fluid expansion further comprises an upper tubular projection of said inner component in fluid communication with said fluid container to allow the fluid level to change freely.

6. The measuring apparatus of claim 1, wherein said fluid is a mixture of alcohol and water.

* * * * *